United States Patent [19]

Kubik et al.

[11] Patent Number: 4,962,577
[45] Date of Patent: Oct. 16, 1990

[54] WORK ROLL WITH IMPROVED SUPPORT AND LUBRICATING SYSTEM FOR AN HYDRAULICALLY SUPPORTED ROLL

[75] Inventors: Klaus Kubik, Tonisvorst; Karl-Heinz Kuesters, Krefeld-Forstwald, both of Fed. Rep. of Germany

[73] Assignee: Eduard Küsters Maschinenfabrik GmbH & Co. KG, Krefeld, Fed. Rep. of Germany

[21] Appl. No.: 494,806

[22] Filed: Mar. 14, 1990

Related U.S. Application Data

[63] Continuation of Ser. No. 355,045, May 15, 1989, abandoned, which is a continuation of Ser. No. 25,603, Mar. 13, 1987, abandoned.

[30] Foreign Application Priority Data

Mar. 13, 1986 [DE] Fed. Rep. of Germany ....... 3608374
Nov. 22, 1986 [DE] Fed. Rep. of Germany ....... 3639935

[51] Int. Cl.$^5$ ............................................. B21B 27/00
[52] U.S. Cl. ..................................... 29/116.2; 29/116.1
[58] Field of Search ................. 29/116.1, 116.2, 113.1, 29/113.2

[56] References Cited

U.S. PATENT DOCUMENTS

| | | | |
|---|---|---|---|
| 3,562,882 | 2/1971 | Widmer et al. | 29/116 R |
| 4,327,468 | 5/1982 | Küsters et al. | 29/116 AD |
| 4,639,990 | 2/1987 | Schiel et al. | 29/116 R |
| 4,679,287 | 7/1987 | Allard . | |

FOREIGN PATENT DOCUMENTS

| | | |
|---|---|---|
| 0179730 | 4/1986 | European Pat. Off. . |
| 3343313 | 6/1985 | Fed. Rep. of Germany . |
| 8490184 | 6/1985 | Fed. Rep. of Germany . |
| 3526283 | 2/1987 | Fed. Rep. of Germany . |

*Primary Examiner*—Timothy V. Eley
*Assistant Examiner*—Irene Cuda
*Attorney, Agent, or Firm*—Kenyon & Kenyon

[57] ABSTRACT

In a roll having a hollow roll through which a stationary cross piece extends, a bearing housing is provided for a bearing which engages an axial extension of the hollow roll. The extension has a smaller outer diameter than the outer diameter of the hollow roll. The bearing is located in the bearing housing between the outside circumference of the extension and the inside circumference of the bearing housing. The bearing housing has lubricant feed and discharge passages separate from means for hydraulically supporting the hollow roll. The bearing housing has a bore which fits over the end of the cross piece without play thereby forming a support distance.

6 Claims, 1 Drawing Sheet

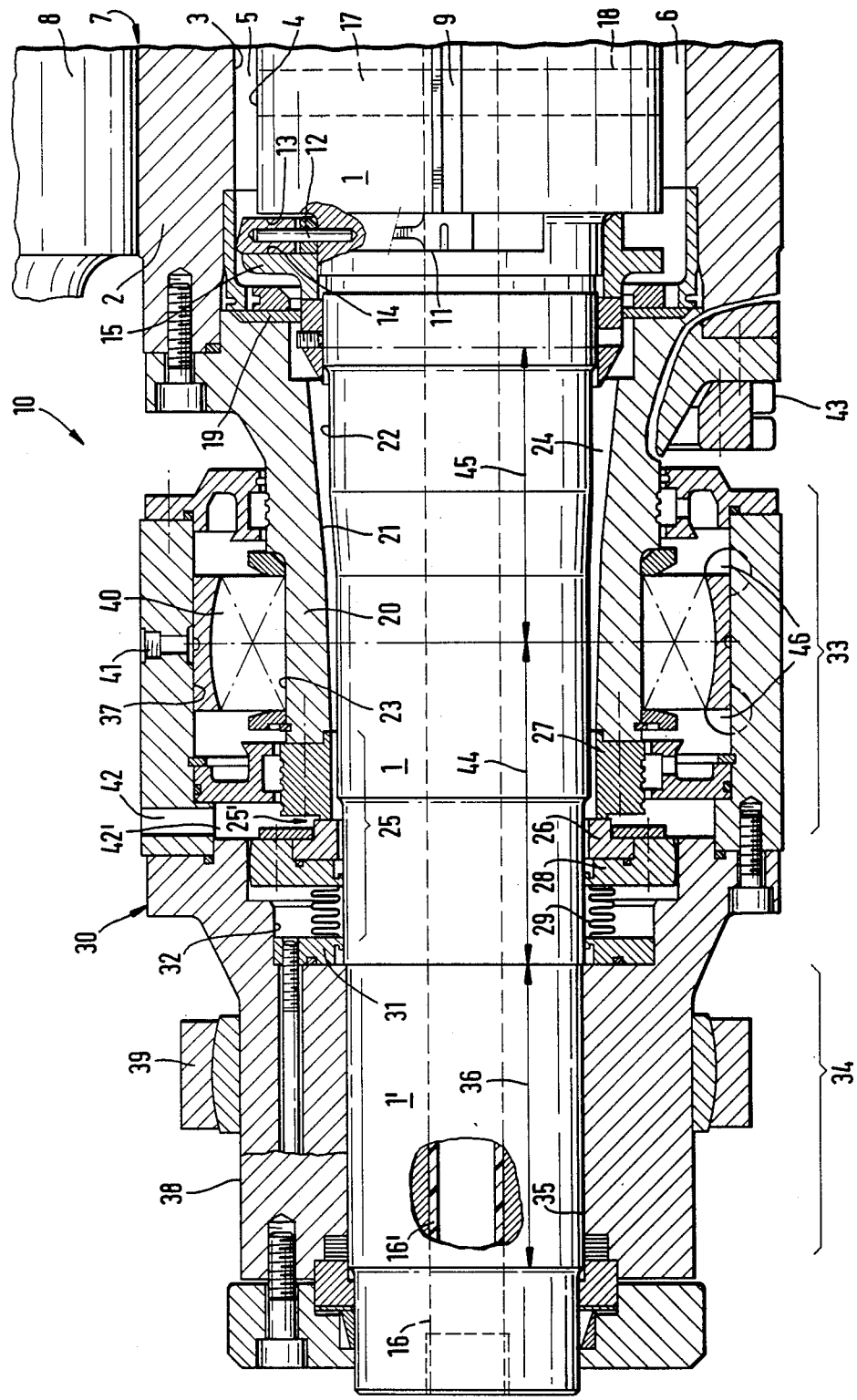

WORK ROLL WITH IMPROVED SUPPORT AND LUBRICATING SYSTEM FOR AN HYDRAULICALLY SUPPORTED ROLL

This application is a continuation of application Ser. No. 07/355,045, filed 5/15/89, now abandoned, which is a continuation of Ser. No. 07/025,603 filed 3/13/87, now abandoned.

BACKGROUND OF THE INVENTION

The invention relates generally to rolls, and more particular to an improved support and lubricating system for an hydraulically supported roll.

Rolls in which a hollow roll of the type having a rotating hollow roll forming a working roll circumference at its outer diameter and a stationary cross piece extending through the hollow roll forming a clearance space therewith, with the cross piece having ends protruding from the hollow roll to which external forces may be applied and a means including a liquid for hydraulically supporting the hollow roll provided at the cross piece, the hollow roll further having a bearing arranged at each of its ends which rotatably supports the hollow roll and to which lubricant is conducted are known.

A roll of this type with a sealing arrangement located at the cross piece which divides a longitudinal chamber formed between the hollow roll and the cross piece is described in German Patent No. 31 28 140. The seal disclosed therein comprises transverse end seals provided at the opposite ends of the longitudinal chamber as well as longitudinal seals extending along the cross piece and the hollow roll on both sides of the action plane of the roll. This patent shows a seal design for the so-called "floating roll" in which liquid leaking past the transverse end seal lubricates bearings which are arranged outside the transverse end seal to rotatably support the hollow roll on the cross piece. Usually, the liquid is an hydraulic oil which can serve both as the pressure liquid for supporting the hollow roll and the bearing lubricant when the "floating roll" is operated at normal temperatures.

The "floating roll" may also be used as a heated roll in which the pressure liquid is brought to an elevated temperature. The "floating roll" is particularly well suited for heating applications because, even though a large cross section for conducting the heating liquid is provided, good temperature uniformity over the width of the web of material can nevertheless be achieved with suitable control of the stream of liquid. This is accomplished by allowing the pressure liquid in a longitudinal pressure chamber formed adjacent to the rolling gap to flow in one direction along the roll and then in the opposite direction where it is collected in a longitudinal leakage chamber.

However, there are limits to the temperatures that may be achieved in the normal floating roll because the common pressure liquids which have good bearing lubrication properties decompose at higher temperatures. Furthermore, liquids which can withstand higher temperatures do not have sufficient lubricating properties. Therefore, a problem arises when using known rolls as heated rolls because there is a temperature limit which cannot be exceeded due to use of the same liquid for exerting the pressure, supplying the heat and lubricating the bearings.

Other rolls are known in which the pressure liquid used in the hydraulic device to support the hollow roll at the cross piece is also used for lubricating the bearings. In DE-OS No. 24 20 324 the hydraulic device comprises several piston-like pressure elements arranged in the cross piece to act against the inside circumference of the hollow roll in which leakage oil therefrom is used to lubricate the bearings DE-OS No. 29 02 956 shows the provision of additional spray devices which direct hot oil against the inside circumference of the hollow roll.

In order to solve the aforementioned problem and other disadvantages of known rolls, it is a primary object of this invention to provide a hollow roll of the type previously specified in which ambient temperatures of about 240° to 250° C. at the working circumference of the roll can be achieved. This requires the heat carrier liquid in the longitudinal chambers to be maintained at temperatures of 260° to 280° C.

It is a more specific object of this invention to separate the pressure and heat carrier liquid located in the clearance space between the hollow roll and the cross piece from the bearing lubricant by a distance such that no substantial heat transfer occurs between the heat carrier liquid and the lubricant.

Another object of the invention is to minimize heat transfer from the pressure and heat carrier liquid into the cross piece and the bearing rotatably supporting the hollow roll.

It is yet another object of this invention to provide for ready access to the aforementioned bearing without separating the cross piece and hollow roll.

Another object of the invention is to provide an external bearing, upon which the roll is supported in a machine frame or the like, having an outside diameter smaller than the outside diameter of the hollow roll in order to overcome spatial constraints.

It is still another object of this invention to provide a housing means for the bearing which supports the cross piece over a sufficient distance free of play in order to withstand the torque exerted by the housing when the roll is loaded.

It is yet another object of this invention to provide a seal at the end of an extension of the hollow roll which accommodates for misalignment between the extension and cross piece due to deflection of the cross piece when the hollow roll is loaded.

A still further object of this invention is to prevent air from coming into contact with pressure and heat carrier liquid in the vicinity of the aforementioned seal to obviate the build up of an undesirable gummy coating or film which hampers the effectiveness of the seal.

Finally, another object of the invention is to prevent the excessive leakage of pressure and heat carrier liquid from the longitudinal chamber of the hollow roll.

SUMMARY OF THE INVENTION

These and other objects of the invention which will become apparent from the following are accomplished by providing in a roll of the type previously described the following features:

(a) a bearing housing having a large diameter region and a small diameter region;

(b) an axial extension having one end remote from said hollow roll and another end adjacent said hollow roll, said adjacent extension end attached to one end of the hollow roll, the extension having an outer diameter smaller than the outer diameter of the hollow roll with a portion of the extension disposed within the large diameter region of the bearing housing;

(c) the bearing being located between the outer diameter of the extension and an inner circumference of the large diameter region of the bearing housing;

(d) means for conducting lubricant to the bearing separate from the means for hydraulically supporting and including supply and discharge passages in the bearing housing;

(e) the cross piece extending through the axial extension with radial play, thereby forming a space therebetween, and into a bore in the small diameter region of the bearing housing means without appreciable radial play, thereby forming a support distance within said small diameter region for supporting one end of the cross piece, the applied external forces acting on an outer circumference of the small diameter region; and (f) a seal means disposed between said remote end of the extension and the bearing housing for preventing leakage of liquid from the space between the cross piece and the extension.

These objects are further accomplished by arranging the bearing on the outside of the extension of the hollow roll and therefore radially separate from the pressure- and heat-carrier liquid which is conducted through the cross piece into the interior of the hollow roll. Most of the liquid conducted remains within the hollow roll between the transverse end seals, although small quantities may enter the space between the cross piece and the inside circumference of the extension. Since there is no appreciable flow in the extension no significant heat transfer occurs in this region. The bearing is separated axially from the main quantity of heat carrier liquid by the distance from the transverse end seal in the hollow roll to the engagement region of the bearing with the extension. Thus, heat flow from the hot regions of the hollow roll into the bearing is greatly inhibited. In addition, the bearing is cooled by lubricating liquid which is separate from the heat transfer liquid and continuously flows in the bearing housing.

The bearing of this invention can readily be exposed for repair, replacement, or inspection by removing the bearing housing, which is arranged outside of the extension, without separating the cross piece and the hollow roll.

The external forces are designed to act in the small diameter region of the bearing housing such that the outer diameter of the external bearing, on which the bearing housing is supported in a machine frame or the like, is smaller than the outer diameter of the hollow roll which is advantageous for space and design considerations.

Provision of a tapered extension at the end of hollow roll having a bearing arranged on the outside of the extension and which is supported in a bearing housing is known from European Patent No. 43 119. However, the bearing housing disclosed therein is not supported axially outside the bearing on the cylindrical end of the cross piece extending to this point, as is disclosed in this invention. To the contrary, the bearing housing of European Patent 43 119 has a hollow collar piece which protrudes toward the hollow roll into the interior of the extension in which the end of the cross piece is held via a bearing which can accommodate for misalignment if the cross piece is bent.

The fit of the bearing housing free of radial play over a support distance of the cross piece is necessary to handle the torque which is exerted on the bearing housing if the roll is loaded. A sufficient support distance is at least equal to the distance between the inner end of the bore formed in the small diameter region of the bearing housing and the center of the bearing.

To minimize heat transfer from the pressure and heat carrier liquid into the cross piece and the bearings, a heat-insulated passage is provided in the cross piece.

Provision of a sliding-ring seal at the end of the extension is desirable to accommodate any misalignment which may occur between the extension and the cross piece during the bending of the cross piece under the influence of a load. Furthermore, since the heat carrier liquid present at the sliding-ring seal has a tendency to gum up and coat the sliding surface of the cross piece in the presence of air, thereby adversely affecting the operation of the seal, an inert gas, such as nitrogen, is conducted through the bearing housing to the sliding surface to prevent this effect.

Excessive flow of the high temperature liquid in the space between the extension and the cross piece is prevented by a deflection ring provided within the hollow roll. The ring acts as a coarse seal redirecting the majority of the arriving liquid escaping from the space between the cross piece and the hollow roll into the leakage chamber where it is led to an outlet canal. The amount of liquid passing into the space between the extension and the cross piece is thus small so that no substantial amounts of heat are transferred by the escaping liquid into the surrounding structural parts.

BRIEF DESCRIPTION OF THE DRAWINGS

The sole FIGURE shows a partial longitudinal cross section through the left end of a roll made according to the invention

DETAILED DESCRIPTION

The left-hand side of a roll 10, comprises a stationary cross piece 1 in the form of a substantially solid and a cylindrical support around which a hollow roll 2 rotates. It is understood that the right-hand side of the roll may be of similar construction. Hollow roll 2 has an outer working circumference formed by its outer diameter which cooperates with an outer working circumference of counter-roll 8 to conduct a web of material through rolling gap 7 in a manner known in the art. An annular clearance space is formed between the inner circumference 3 of the hollow roll 2 and the outer circumference 4 of the cross piece 1. This space is divided into a longitudinal pressure chamber 5 which is located adjacent the rolling gap 7 and a longitudinal leakage chamber 6 disposed on the side remote from gap 7. These chambers are generally formed by two longitudinal seals 9 which are positioned on diametrically opposite portions of the cross piece 1, with only one of the longitudinal seals 9 being illustrated in the drawing. The seals 9 rest between the inner circumference 3 of the hollow roll 2 and the outer circumference 4 of the cross piece 1 thereby forming generally semi-annular shaped longitudinal chambers 5 and 6.

Longitudinal pressure chamber 5 is closed off at both ends by transverse end seals 11. In the drawing shown, the transverse end seals 11 extend over the upper half of the cross piece 1 and rest with their outer circumference against the inner circumference 3 of the hollow roll 2. The transverse end seals 11 are mounted on guide pins 12 which extend perpendicular to the axis of the cross piece 1 in the action plane, i.e., the plane in which lies the resultant of the forces exerted by the pressure liquid in longitudinal chamber 5. In many instances, this plane may coincide with the connecting plane of the axis of the hollow roll 2 and the axis of the counter-roll 8. The transverse end seal 11 has a substantially rectangular cross section and rests with one end against a shoulder 13 of the cross piece 1 and with the other end against the shoulder 14 of a holding ring 15 which is held on the cross piece 1 by the guide pin 12.

The longitudinal seals 9 form, along with the transverse end seals 11 arranged at both ends of the hollow roll 2, a closed pressure chamber 5 which can be supplied with pressure and heat carrier liquid via passage or feedline 16 extending axially from one end of the cross piece to an inlet 17 on a top portion of the cross piece. The pressure and heat carrier liquid flows to the right, as viewed in the drawing, from feedline 16 into pressure chamber 5 and passes near the unillustrated remote end of chamber 5 through a transverse canal into the leakage chamber 6 where it flows through the latter from the right to the left to an outlet 18 and an unillustrated outlet canal. The pressure and heat carrier liquid flows in this manner in order to equalize and maintain a uniform temperature throughout the hollow roll. To minimize heat transfer from the liquid into the cross piece 1 and a bearing housing, generally indicated at 30, feedline 16 may be lined with a heat-insulating material as shown at 16'.

In some applications, it may be desirable for the leakage chamber 6 to be filled with the pressure liquid in which case it is also provided with transverse end seals. However, the pressure in the leakage chamber 6 will be smaller than that in the pressure chamber 5 and the exertion of the line pressure in the rolling gap 7 is thereby governed by the difference in pressure between chambers 5 and 6.

However, in the embodiment shown the leakage chamber 6 is not closed off at its ends by transverse end seals. Therefore, pressure liquid can flow past the outlet 18, to the space 24 via the shoulder 13. To ensure that the main quantity of pressure liquid remains in the leakage chamber 6, a deflection ring 19 is provided to direct the flowing liquid back into the leakage chamber 6, where it is discharged via the outlet 18.

If the roll is not a "floating roll", but, for instance, a roll using a hydraulic device having a row of pressure elements acting against the inside circumference 3 of the hollow roll 2, it is not required to seal longitudinal chamber 5. Therefore, in such an embodiment, longitudinal seals 9 and optionally, transverse end seals 11, can be omitted. In the clearance space between the cross piece 1 and the hollow roll 2 there may be liquid which escaped from the pressure and/or heating elements which are arranged in the hollow roll at the unillustrated right end of the drawing. Substantial flow of leaked fluid toward the left, as viewed in the drawing, is prevented by the deflection ring 19. The construction of the outer parts of the roll, i.e., those parts located to the left of the deflection ring 19, which will be subsequently described, are the same regardless of which type of hydraulic device is employed.

The hollow roll 2 is fastened at the one end face shown to a sleeve-or bushing-like extension 20, which outwardly extends the hollow roll 2. The outer circumference 23 of extension 20 has a diameter smaller than the outer diameter of the hollow roll 2. The inner circumference 21 of the extension 20 is large enough to form a small space 24 with the end of the cross piece 1 which protrudes from the hollow roll 2. Small amounts of the pressure and heat carrier liquid may pass from the leakage chamber 6 past deflection ring 19 into space 24. Substantial flow into space 24 cannot occur because the latter is closed at its left end by a sliding-ring seal generally designated at 25.

The sliding-ring seal 25 comprises a sliding ring 26 which forms at its inner circumference a small clearance with the cross piece 1, a counter-ring 27 which is connected to one end face of the extension 20 and a guide ring 28 which maintains the sliding ring 26 in the correct position. The sliding ring 25 is sealed by metal bellows 29. The metal bellows 29 is connected at one axial end to guide ring 28 and at its other end to a holding ring 31 which is fastened in a cylindrical recess 32 of bearing housing 30.

In the embodiment shown, bearing housing 30 comprises two parts, as generally indicated at its large diameter region 33 and small diameter region 34. Region 34 has a smaller inside and outside diameter than the respective diameters of region 33. Region 33 has a slightly smaller outer diameter than the outer diameter of hollow roll 2. The inner diameter of region 33 faces extension 20 of hollow roll 2. The inner circumference 35 of housing region 3 is formed by a bore which fits snugly over the cylindrical end part 1' of the cross piece 1 without significant play throughout a guiding and supporting distance 36. This arrangement maintains proper alignment between the axis of the cross piece and the axis of the bearing housing 30 even if housing 30 is radially loaded outside the region 34. Such a load can arise due to forces acting on the bearing 40 which rotatably supports the hollow roll 2 via its engagement with extension 20. Bearing 40 is located in the region 33 of the bearing housing 30 between its inner circumference 37 and the outer circumference 23 of the extension 20. The cross piece 1 may deflect due to a load within the hollow roll 2 and the bearing housing 30 follows this deflection since it is firmly connected to the cross piece 1 via the guiding distance 36. However, the hollow roll 2 does not follow this deflection because bearing 40 is a self-aligning bearing which can compensate for alignment errors between surfaces 23 and 37.

External forces are introduced into the end 1' of the cross piece 1, which protrudes from the hollow roll 2 in the region 34, by self-aligning bearing 39 arranged on the outer circumference 38 of the bearing housing 30. However, unlike self-aligning bearing 40, bearing 39 is not a rotating bearing because the bearing housing 30 and cross piece 1 are stationary. Since the outer circumference 38 of the region 34 of the bearing housing 30 has a substantially smaller diameter than that of the hollow roll 2, the outer diameter of the self-aligning bearing 39 is desirably designed to be smaller than the outside diameter of the hollow roll 2.

In accordance with the roll construction principles of this invention, the circulation of the pressure and heat carrier liquid in the longitudinal chambers 5 and 6 is entirely separate from the lubrication circulation for the bearing 40. While it is possible for some of the pressure and heat carrier liquid to flow past deflection ring 19 into the space 24, this space is sealed by the sliding-ring seal 25. The lubricating liquid for the bearings 40 is fed into housing 30 at the inlet 41 and eggresses therefrom at outlets 46 without the formation of a pressure head. In addition to lubricant, any minimal quantities of the pressure and heat carrier liquid which escaped from the space 24 via sliding-ring seal 25 are conducted to outlets 46. Since any liquid in the space 24 is standing and does not flow, it is quickly cooled by the continuous flow of lubricant, which is at a lower temperature than the pressure and heat carrier liquid. This prevents appreciable heat transfer into bearing 40. The insulation 16' of the feedline 16 and the arrangement of the bearing 40 radially outside of the extension 20 also contribute to the prevention of heat transfer to the bearing.

The sliding surface 25' of the sliding-ring seal 25 is surrounded by an annular chamber 42' to which nitrogen or other inert gas can be fed by an inlet 42. This prevents any heat carrier liquid passing from the space 24 to the sliding surface 25' from coming into contact with ambient air and thereby forming a gummy layer or coating on the sliding surface 25' which adversely affects the operation of the seal 25.

If desired, the hollow roll 2 can be rotatably driven in any suitable manner, such as by a simple wheel and chain drive arranged at one end of the hollow roll 2, such as shown at 43.

The guiding distance 36 must be of sufficient length to adequately support the bearing housing 30 against the tilting forces or moments introduced by the bearing 40. To this end the guiding distance 36 is designed to be approximately equal to the distance 44 which is measured from the end of the inner circumference 35 adjacent ring 31 to the center of the bearing 40. This distance may be also advantageously designed to be approximately equal to the distance 45 from the center of bearing 40 to the near end of the hollow roll 2 adjacent extension 20. The axial distance 45 is designed to be long enough to prevent appreciable heat transfer between the hot zone in the vicinity of longitudinal chambers 5 and 6 and the bearing 40. The space 24 between the extension 20 and the end of the cross piece 1 is also of predetermined longitudinal extent selected such that the pressure-and heat-carrier liquid can "run itself out" thereby preventing appreciable flow and heat transport to bearing 40.

What is claimed is:

1. In a roll having a rotating hollow roll forming a working roll circumference at its outer diameter and a stationary cross piece extending through the hollow roll forming a clearance space therewith, with said cross piece having ends protruding from the hollow roll to which external forces may be applied and a means including a liquid for hydraulically supporting the hollow roll provided at the cross piece, said hollow roll further having a bearing arranged at each of its ends which rotatably supports the hollow roll and to which lubricant is conducted, the improvement comprising:
   (a) a deflectable bearing housing having a large diameter region and a small diameter region;
   (b) an axial extension having one end remote from said hollow roll and another end adjacent said hollow roll, said adjacent extension end attached to one end of the hollow roll, said extension having an outer diameter smaller than the outer diameter of the hollow roll with a portion of said extension disposed within the large diameter region of the bearing housing;
   (c) said bearing being located between the outer diameter of the extension and an inner circumference of said large diameter region of said bearing housing; and
   (d) said cross piece extending through said axial extension with radial play, thereby forming a space therebetween, and into a bore in said small diameter region of the bearing housing without appreciable radial play thereby forming a support distance within said small diameter region for supporting one end of the cross piece, said small diameter region of the bearing housing being directly connected to said cross piece over said support distance such that the bearing housing follows the deflections of the cross piece and the applied external forces act on an outer circumference of said small diameter region to support the roll.

2. A roll according to claim 1 wherein said bore has an inner and outer end, and said support distance is at least equal to the distance between the inner end of the bore and the center of the bearing.

3. A roll according to claim 1 wherein said hydraulic means further comprises a heat-insulated passage disposed within the cross piece for conducting liquid to a pressure chamber formed in said clearance space of the hollow roll.

4. A roll according to claim 3 further comprising a leakage chamber formed in said clearance space and a deflection ring, located within said hollow roll abutting the axial extension, redirecting liquid escaping from the leakage chamber back into said leakage chamber.

5. A roll according to claim 1 further comprising:
   means for conducting all of the lubricant to the bearing separate from said means for hydraulically supporting and including supply and discharge passages in said bearing housing; and
   a seal disposed between said remote end of the extension and the bearing housing for preventing leakage of liquid from said space between said cross piece and said extension.

6. A roll according to claim 5 wherein said seal is a sliding-ring seal adapted to slide on an outer surface of the cross piece and a passage in the bearing housing means conducts an inert gas to said surface.

* * * * *

UNITED STATES PATENT AND TRADEMARK OFFICE
CERTIFICATE OF CORRECTION

PATENT NO. : 4,962,577

DATED : Oct. 16, 1990

INVENTOR(S) : Klaus Kubik et al.

It is certified that error appears in the above-identified patent and that said Letters Patent is hereby corrected as shown below:

In Column 6, line 24, change "housing region 3 is..."
to read --housing region 34 is...--

Signed and Sealed this

Fourteenth Day of July, 1992

Attest:

DOUGLAS B. COMER

*Attesting Officer*   Acting Commissioner of Patents and Trademarks